(12) United States Patent
Tada et al.

(10) Patent No.: US 7,116,493 B2
(45) Date of Patent: *Oct. 3, 2006

(54) BEAM SHAPING DEVICE

(75) Inventors: Kazunari Tada, Amagasaki (JP); Junji Hashimura, Sagamihara (JP); Yuichiro Ori, Moriyama (JP)

(73) Assignee: Konica Minolta Opto, Inc., Hachioji (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/952,282

(22) Filed: Sep. 27, 2004

(65) Prior Publication Data

US 2005/0213224 A1    Sep. 29, 2005

(30) Foreign Application Priority Data

Mar. 24, 2004  (JP)  ............................. 2004-087354
Jun. 30, 2004  (JP)  ............................. 2004-193045

(51) Int. Cl.
*G02B 3/02*   (2006.01)
*G02B 13/08*  (2006.01)

(52) U.S. Cl. ..................... 359/708; 359/710; 359/719

(58) Field of Classification Search ............... 359/708, 359/710, 719
See application file for complete search history.

(56) References Cited

U.S. PATENT DOCUMENTS

| | | | | |
|---|---|---|---|---|
| 5,467,335 A | 11/1995 | Braat | ........................ | 369/100 |
| 5,917,660 A * | 6/1999 | Ohtaki | ........................ | 359/710 |
| 5,973,853 A | 10/1999 | Gaebe et al. | ................ | 359/668 |
| 6,026,206 A | 2/2000 | Gaebe | ........................ | 385/33 |
| 6,088,170 A * | 7/2000 | Lee et al. | .................... | 359/710 |
| 6,347,015 B1 | 2/2002 | Ando | ........................ | 359/719 |

FOREIGN PATENT DOCUMENTS

| | | |
|---|---|---|
| JP | 4-263131 A | 9/1992 |
| JP | 8-307006 A | 11/1996 |
| JP | 9-258099 A | 10/1997 |
| JP | 2002-208159 A | 7/2002 |
| JP | 2003-178480 A | 6/2003 |
| JP | 2004-247032 A | 9/2004 |
| JP | 2004-2470329 A | 9/2004 |

OTHER PUBLICATIONS

PCT "International Search Report and Written Opinion", dated May 10, 2005, for counterpart International Patent Application No. PCT/JP/2005/004451, along with an English-language translation thereof.

PCT "International Preliminary Report on Patentability" with Amended claims under PCT Article 34, dated Nov. 18, 2005, for counterpart International Patent Application No. PCT/JP/2005/004451, along with an English-language translation thereof for each.

\* cited by examiner

*Primary Examiner*—Scott J. Sugarman
*Assistant Examiner*—Darryl J. Collins
(74) *Attorney, Agent, or Firm*—Sidley Austin LLP

(57) ABSTRACT

In a beam shaping device for converting the laser light emitted from a semiconductor laser light source from an elliptic beam to a circular beam, the light-entrance-side and light-exit-side surfaces of the beam shaping device both have a curvature only in the major-axis direction of the cross section of the elliptic beam. Of the light-entrance-side and light-exit-side surfaces, one is a circular-arc cylindrical surface and the other is a non-circular-arc cylindrical surface.

23 Claims, 11 Drawing Sheets

BEAM SHAPING DEVICE

This application is based on Japanese Patent Applications Nos. 2004-87354 and 2004-193045 filed on Mar. 24, 2004 and Jun. 30, 2004, respectively, the contents of which are hereby incorporated by reference.

BACKGROUND OF THE INVENTION

1. Field of the Invention

The present invention relates to a beam shaping device. More particularly, the present invention relates to a beam shaping device that is used, for example, in an optical pickup apparatus to convert the laser light emitted from a semiconductor laser light source from an elliptic beam to a circular beam.

2. Description of Related Art

Optical systems for optical pickups typically use a laser diode as a light source, and the laser beam emitted from a laser diode is a divergent beam having an elliptic sectional shape. If this divergent beam as it is emitted is made to converge with an objective lens, it may illuminate only part of the circular recording region, or it may unnecessarily illuminate an area outside the recording region, either way leading to lowered recording and reproducing accuracy. To prevent this, the laser beam needs to be so shaped that it has a circular sectional shape when it strikes the recording medium.

On the other hand, in recent years, blue semiconductor lasers have come to be increasingly used as a laser light source. Because of their short wavelengths, blue semiconductor lasers require stringent accuracy in signals for recording and reproducing. Nevertheless, the outputs of currently available blue semiconductor lasers are so low that it is impossible to obtain sufficient laser power to achieve satisfactorily accurate recording and reproducing. This problem can be solved by converting the laser light from an elliptic beam to a circular beam, because this increases the efficiency with which the laser light is used. From this perspective also, techniques for beam shaping have been becoming very important.

Beam shaping is most commonly achieved by the use of a prism. However, for beam shaping to be achieved by the use of a prism, laser light needs to be collimated in advance. This requires a collimator lens, causing the following and other inconveniences. In a case where, for example, a blue laser is used, disposing a collimator lens on the light-source side of a beam shaping prism makes it impossible to move the collimator lens for the purpose of correcting the spherical aberration resulting from errors in the disk substrate.

To avoid these inconveniences, there have conventionally been proposed beam shaping devices that achieve beam shaping by the use of a lens surface. For example, Patent Publication 1 listed below proposes a beam shaping device having anamorphic surfaces on both sides; Patent Publication 2 listed below proposes a beam shaping device having cylindrical surfaces on both sides. By using these beam shaping devices, it is possible to convert a divergent beam from an elliptic beam directly to a circular beam while producing hardly any aberration.

Patent Publication 1: Japanese Patent Application Laid-Open No. H9-258099
Patent Publication 2: Japanese Patent Application Laid-Open No. 2002-208159

These conventional beam shaping devices, however, have the following disadvantages. Giving a beam shaping device anamorphic surfaces on both sides as proposed in Patent Publication 1 makes it difficult to produce the mold for forming the beam shaping device. This makes the beam shaping device unsuitable for mass production and expensive to produce. On the other hand, the beam shaping device proposed in Patent Publication 2 is of the type that enlarges the beam diameter in the minor-axis direction of the elliptic beam, and thus makes the NA (numerical aperture) of the exiting beam large. This causes the laser light to be incident at a large angle on the beam splitter for optical path integration/separation which is disposed on the downstream side of the beam shaping device, and thus makes the design of the PBS (polarizing beam splitter) film or the like difficult. Moreover, the sharply diverging beam makes it impossible to secure a sufficient distance between the beam shaping device and the collimator lens, and thus makes the arrangement of the optical components on the downstream side of the beam shaping device difficult.

SUMMARY OF THE INVENTION

In view of the conventionally experienced inconveniences and disadvantages described above, it is an object of the present invention to provide a beam shaping device that offers good performance, that is easy to produce, and that is suitable for use in the optical system of an optical pickup.

To achieve the above object, in one aspect of the present invention, a beam shaping device for converting the laser light emitted from a semiconductor laser light source from an elliptic beam to a circular beam is characterized in that the light-entrance-side and light-exit-side surfaces of the beam shaping device both have a curvature only in the major-axis direction of the cross section of the elliptic beam, and that, of the light-entrance-side and light-exit-side surfaces, one is a circular-arc cylindrical surface and the other is a non-circular-arc cylindrical surface.

In another aspect of the present invention, an optical pickup apparatus for recording and/or reproducing optical information to and/or from an optical information recording medium is provided with: a laser light source that emits a laser beam in the form of an elliptic beam; a beam shaping device constructed as described above; and an objective lens that condenses the laser beam on the optical recording surface of the optical information recording medium.

According to the present invention, a beam shaping device has a circular-arc cylindrical surface and a non-circular-arc cylindrical surface of which both have a curvature only in the major-axis direction of the cross section of an elliptic beam. This makes it possible to realize a lightweight, compact, and high-performance beam shaping device that is easy to produce, that is suitable for use in the optical system of an optical pickup, and that affords a high shaping magnification. Using a beam shaping device according to the present invention in an optical pickup apparatus contributes to enhanced recording and reproducing accuracy and to enhanced laser light use efficiency. This makes it possible to cope with a blue laser.

DETAILED DESCRIPTION OF PREFERRED EMBODIMENTS

Figure 1A:
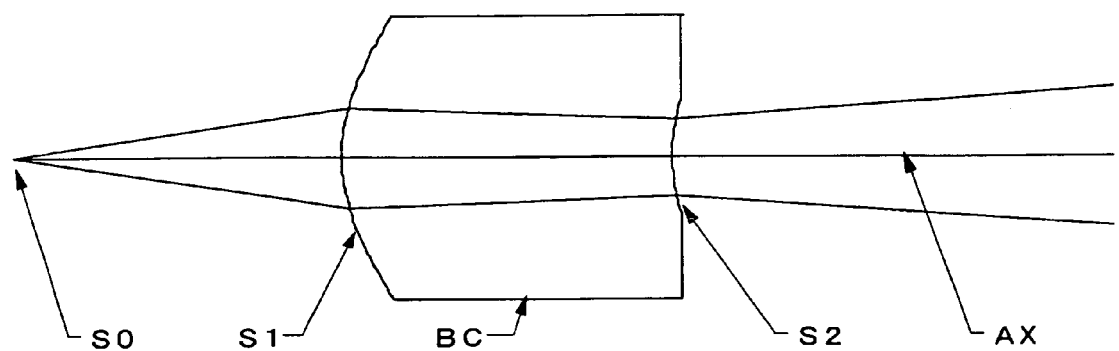
FIGS. 1A and 1B are optical construction diagrams showing a beam shaping device (Example 1) embodying the invention.
Figure 1B:
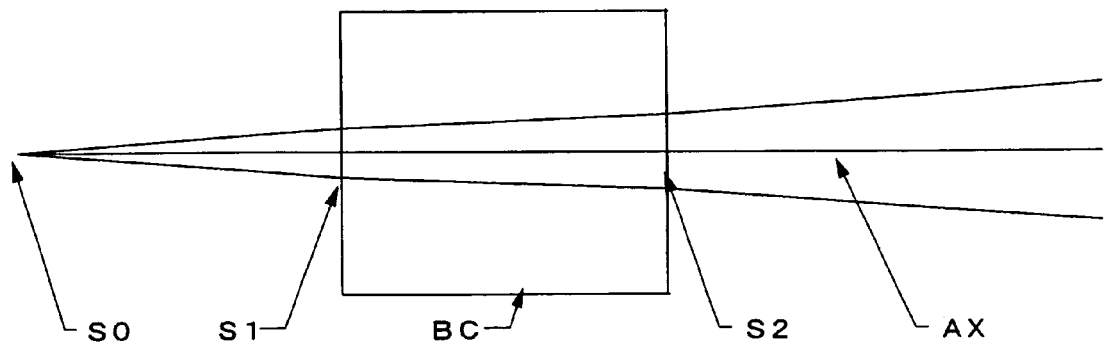
Figure 2:
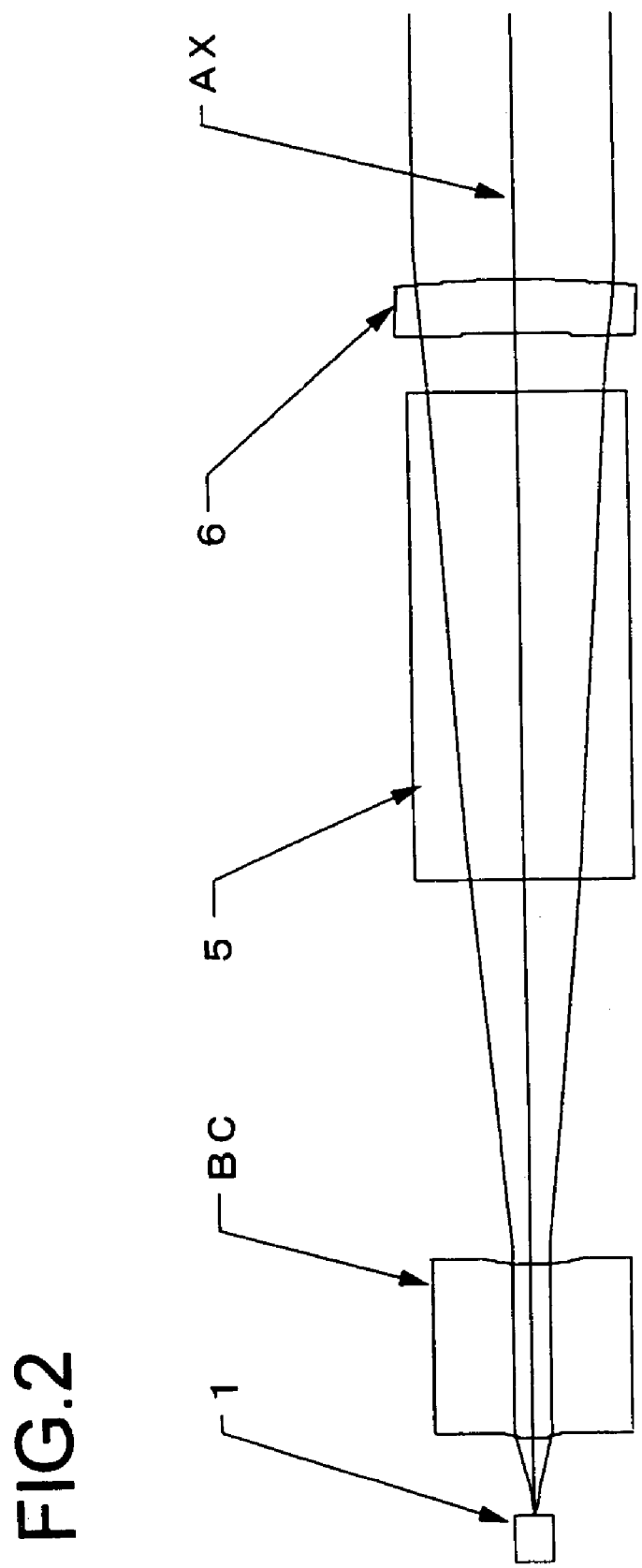
FIG. 2 is an optical construction diagram showing the beam shaping device of FIGS. 1A and 1B arranged in the optical path from a laser light source to a collimator lens.
Figure 3:
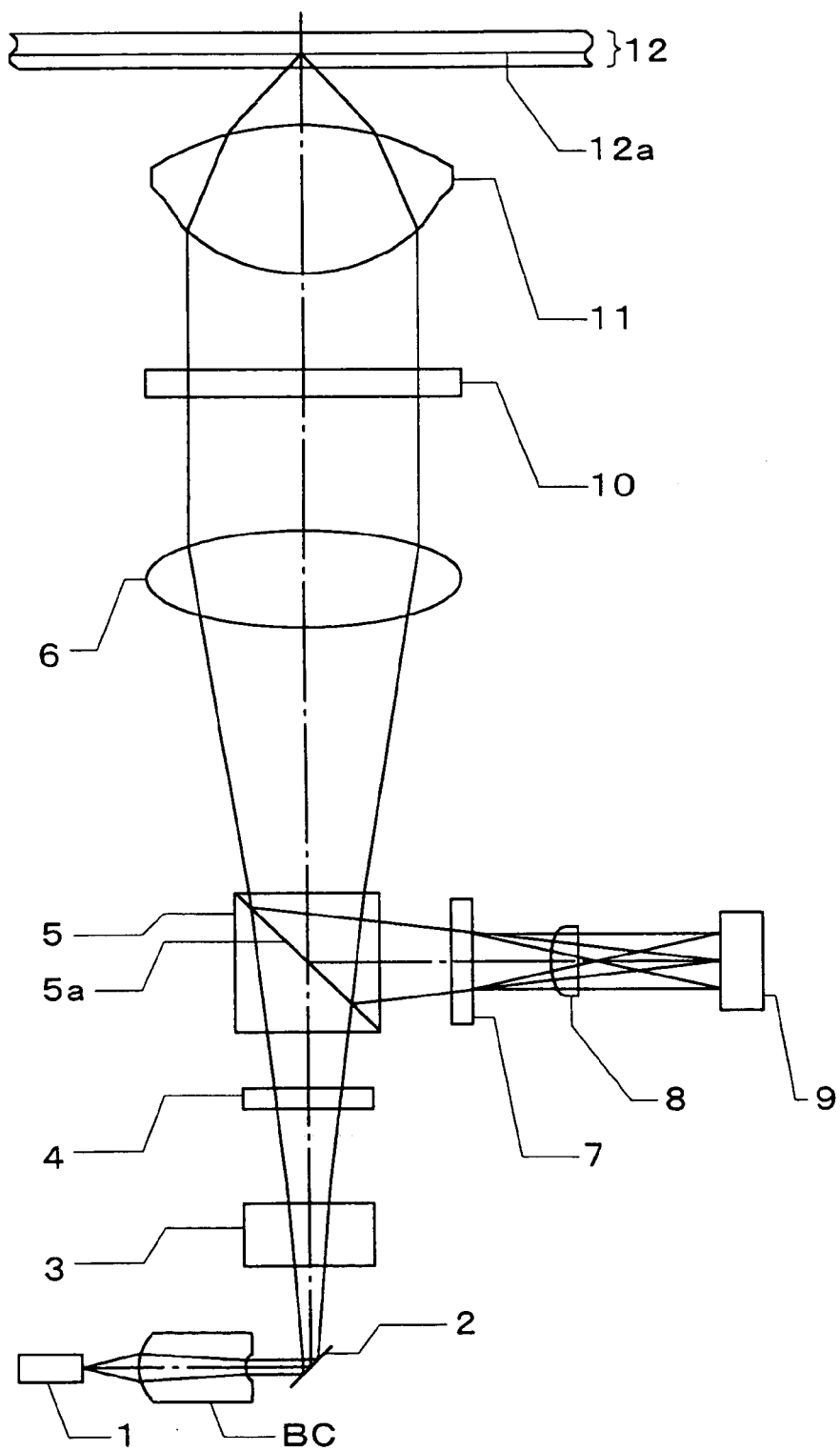
FIG. 3 is a diagram schematically showing the construction of a principal portion of an optical pickup apparatus incorporating the beam shaping device of FIGS. 1A and 1B.

Hereinafter, a beam shaping device and a related optical apparatus embodying the present invention will be described with reference to the drawings. FIGS. 1A and 1B show a beam shaping device BC embodying the invention, in optical sections thereof. FIG. 2 shows the beam shaping device BC arranged in the optical path from a laser light source 1 to a collimator lens 6, in an optical section thereof. FIG. 3 schematically shows the construction of a principal portion of an optical pickup apparatus incorporating the beam shaping device BC. Here, the following is assumed: in a rectangular coordinate system (X, Y, Z), the major and minor axes of the cross section of the elliptic beam of the laser light run in the X and Y direction, respectively, and the optical axis AX runs in the Z direction. Under this assumption, FIG. 1A shows the XZ section of the beam shaping device BC, FIG. 1B shows the YZ section of the beam shaping device BC, and FIGS. 2 and 3 show an XZ section.

The optical pickup apparatus shown in FIG. 3 is capable of recording and reproducing optical information to and from an optical information recording medium. Used as the laser light source 1 is a semiconductor laser source (such as a laser diode, abbreviated to LD) that emits laser light having a wavelength of, for example, 407.7 nm. The laser light emitted from the laser light source 1 enters the beam shaping device BC, which converts the laser light from an elliptic beam to a circular beam while keeping it convergent (so that the laser beam comes to have a circular or approximately circular cross section).

This beam shaping device BC is of the type that converts laser light from an elliptic beam to a circular beam by reducing the beam diameter in the major-axis direction (X direction) of the cross section of the elliptic beam. Accordingly, as shown in FIGS. 1A and 1B, the first surface (light-entrance-side surface) S1 and second surface (light-exit-side surface) S2 of the beam shaping device BC both have a curvature only in the major-axis direction (X direction) of the cross section of the elliptic beam of the laser light. With respect to the X direction, the first surface S1 is convex to the light-entrance side, and the second surface S2 is concave to the light-exit side. Moreover, of the first and second surfaces S1 and S2, one is a circular-arc cylindrical surface, and the other is a non-circular-arc cylindrical surface. That is, one surface is a cylindrical surface that describes a circular arc when observed in a cross section thereof taken in the direction in which it has the curvature, and the other surface is a cylindrical surface that describes a non-circular arc when observed in a cross section thereof taken in the direction in which it has the curvature.

Having been shaped into a circular beam by the beam shaping device BC, the laser light is then reflected upward by a mirror 2, and then passes through a half-wave plate 3, where the laser light is subjected to conversion from s-polarized light to p-polarized light. The laser light is then subjected to beam splitting by a diffraction grating 4 for tracking error detection, and then enters a polarizing beam splitter 5 for optical path integration/separation. In the polarizing beam splitter 5, the laser light is transmitted through a PBS (polarizing beam splitter) film 5a provided therein, and then exits from the polarizing beam splitter 5. The laser light then enters a collimator lens 6, which collimates the laser light into a parallel beam. The laser light then passes through a quarter-wave plate 10, then passes through an objective lens 11, and is then focused on the optical recording surface 12a of an optical information recording medium 12. The laser light reflected by the optical recording surface 12a of the optical information recording medium 12 travels backward along the optical path, and enters the polarizing beam splitter 5 again. This time, the laser light, which has passed through the quarter-wave plate 10 twice and therefore which is now s-polarized light, is reflected by the PBS film 5a, and then exits from the polarizing beam splitter 5. The laser light is then subjected to beam splitting by a HOE (holographic optical element) 7 for focusing error detection, then passes through a cylindrical lens 8 for condensing tracking and focusing error detection light, and is then detected, as signal light, by a photodiode 9.

In a beam shaping device, like the beam shaping device BC of this embodiment, that serves to convert the laser light emitted from a semiconductor laser light source from an elliptic beam to a circular beam, it is preferable that the light-entrance-side and light-exit-side surfaces thereof both have a curvature only in the major-axis direction of the cross section of the elliptic beam, and that, of those two surfaces, one be a circular-arc cylindrical surface and the other be a non-circular-arc cylindrical surface. By giving both the light-entrance-side and light-exit-side surfaces a curvature only in the major-axis direction (X direction) of the cross section of the elliptic beam, it is possible to achieve beam shaping such that the beam diameter is reduced in the major-axis direction of the cross section of the elliptic beam. This makes it possible to realize a beam shaping device that affords a high shaping magnification and that is suitable for mass production. By reducing the beam diameter in the major-axis direction of the cross section of the elliptic beam, it is possible to make the light-exit-side NA (numerical aperture) small. This makes it possible, for example, to give a gentler curvature to the collimator lens 6 (FIG. 3) disposed on the downstream side, and thereby to make the production of the collimator lens 6 easier. Also with respect to the design of the PBS film 5a (FIG. 3) of the polarizing beam splitter 5, the smaller angle of incidence helps greatly reduce the number of layers and accordingly simplify the construction. This helps reduce production errors in film design, and thus helps improve the yield and thereby reduce the production cost. In addition, it is possible to increase the distance from the beam shaping device to the collimator lens. This permits easy arrangement of a beam splitter, DOE (diffractive optical element), or the like for beam splitting between the beam shaping device and the collimator lens.

With respect to the surface shapes of the beam shaping device, using cylindrical surfaces on both sides as described above, compared with using anamorphic surfaces, makes it far easier to produce the mold. This helps improve the yield and reduce the production costs, and helps make the assembly and alignment of the beam shaping device easy. Using a circular-arc cylindrical surface as one surface and a non-circular-arc cylindrical surface as the other helps obtain benefits in terms of both optical performance and ease of production. However, using non-circular-arc cylindrical surfaces on both sides results in unduly high sensitivity to the translational decentering of each surface as observed in the direction in which it has a curvature. This leads to lower production yield in lens formation, and makes the beam shaping device unsuitable for mass production. On the other hand, using circular-arc cylindrical surfaces on both sides results in large high-order aberrations. This makes it impossible to obtain good design performance, and makes it difficult to secure a high shaping magnification. Accordingly, it is preferable that the beam shaping device be so configured as to include both a circular-arc cylindrical surface and a non-circular-arc cylindrical surface.

The above benefits can be obtained either by using a non-circular-arc cylindrical surface as the light-entrance-side surface and a circular-arc cylindrical surface as the light-exit-side surface or by using a circular-arc cylindrical surface as the light-entrance-side surface and a non-circular-arc cylindrical surface as the light-exit-side surface. For easier production, however, it is preferable to use a non-circular-arc cylindrical surface as the light-entrance-side surface and a circular-arc cylindrical surface as the light-exit-side surface. Moreover, in the type that, as in this embodiment, reduces the beam diameter in the major-axis direction (X direction) of the cross section of the elliptic beam, it is preferable that the light-entrance-side surface be a convex surface and the light-exit-side surface be a concave surface. This makes it possible to realize a beam shaping device that offers better design performance and that is easy to produce.

As described above, with respect to the light-entrance-side and light-exit-side surfaces of the beam shaping device, by giving both of them a curvature only in the major-axis direction of the cross section of the elliptic beam, and using a circular-arc cylindrical surface as one of them and a non-circular-arc cylindrical surface as the other, it is possible to realize a lightweight, compact, and high-performance beam shaping device while giving it a construction that is easy to produce and that is suitable for use in the optical system of an optical pickup. Using such a beam shaping device in an optical pickup apparatus contributes to making the apparatus as a whole lightweight, compact, and inexpensive. Now, the conditions to be fulfilled in order to strike a proper balance between such benefits and in addition to obtain a high shaping magnification, still higher optical performance, and other desirable characteristics will be described.

With respect to the relationship between the light source position and the beam shaping device, it is preferable that conditional formula (1) below be fulfilled.

$$1 \leq T1/T0 \leq 10 \tag{1}$$

where

T1 represents the center thickness of the beam shaping device; and

T0 represents the axial optical distance between the semiconductor laser light source and the beam shaping device.

If the upper limit of conditional formula (1) is disregarded, the beam shaping device is unduly large, inevitably resulting in increased costs and making the system as a whole large and heavy. By contrast, if the lower limit of conditional formula (1) is disregarded, large high-order aberrations result, making it difficult to obtain good design performance. Moreover, the radius of curvature of the first surface tends to be small, making production difficult.

Figure 4:
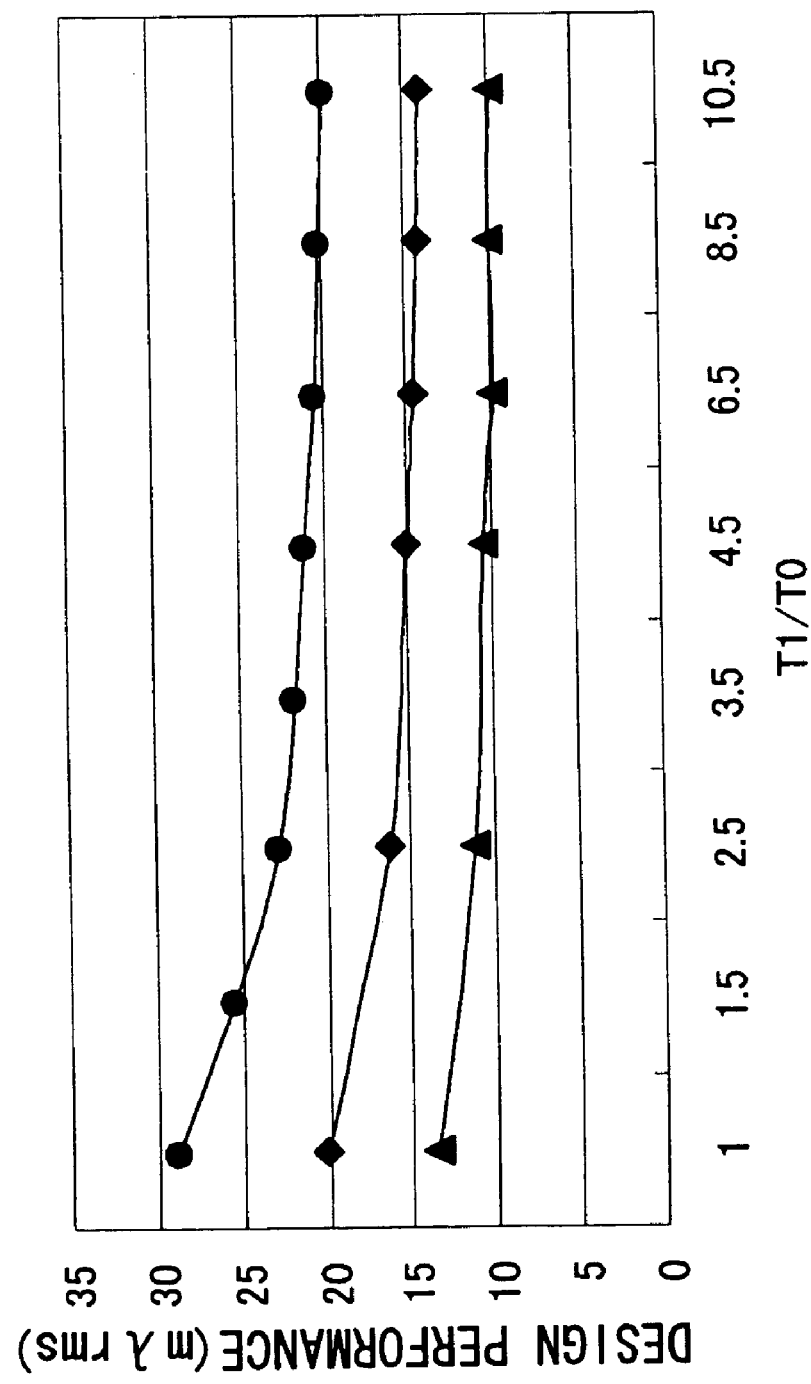
FIG. 4 is a graph showing how the center thickness affects the design performance when the beam shaping device of FIGS. 1A and 1B is used.
Figure 5A:
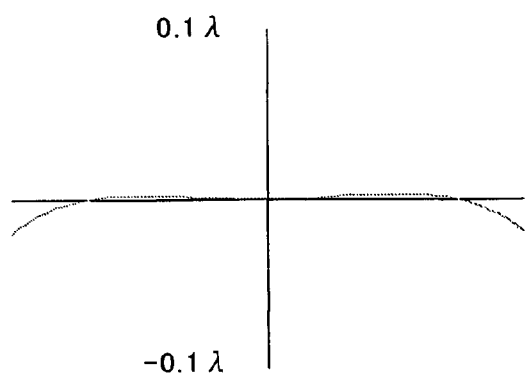
FIGS. 5A and 5B are aberration diagrams showing the axial wavefront aberration observed in Example 1.
Figure 5B:
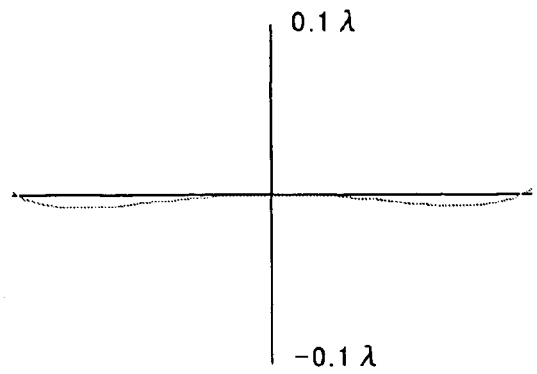
Figure 6A:
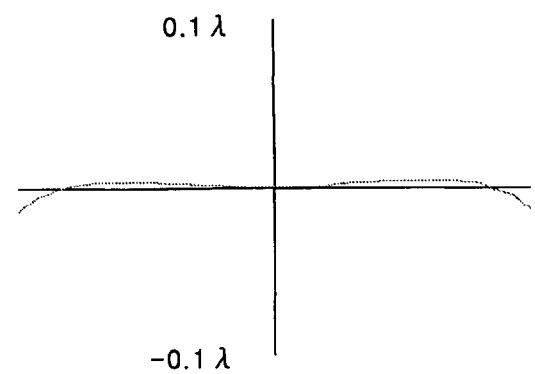
FIGS. 6A and 6B are aberration diagrams showing the axial wavefront aberration observed in Example 2.
Figure 6B:
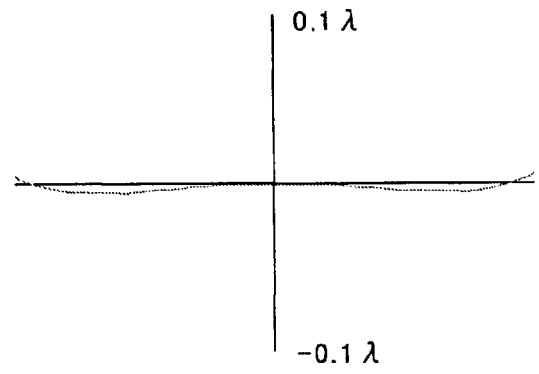
Figure 7A:
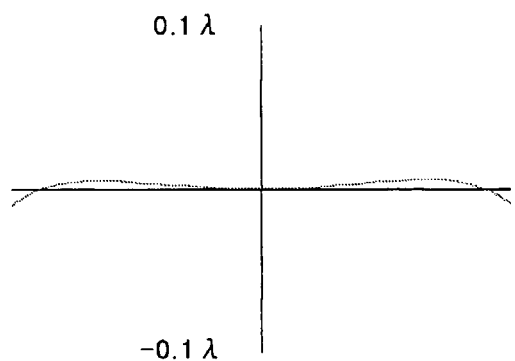
FIGS. 7A and 7B are aberration diagrams showing the axial wavefront aberration observed in Example 3.
Figure 7B:
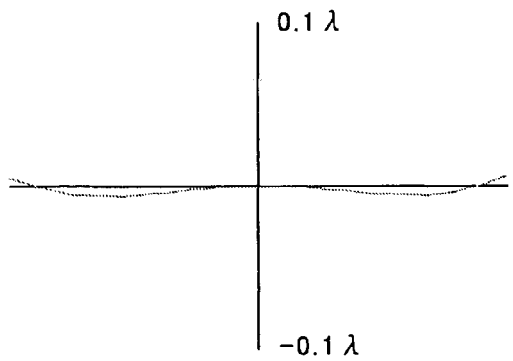
Figure 8A:
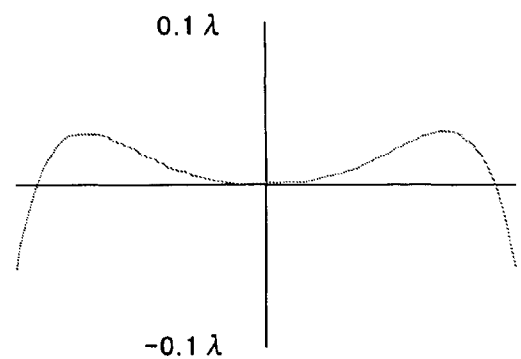
FIGS. 8A and 8B are aberration diagrams showing the axial wavefront aberration observed in Example 4.
Figure 8B:
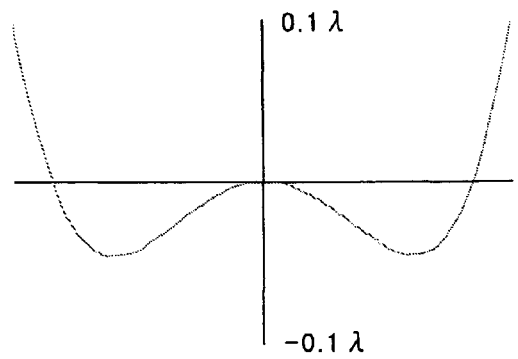
Figure 9A:
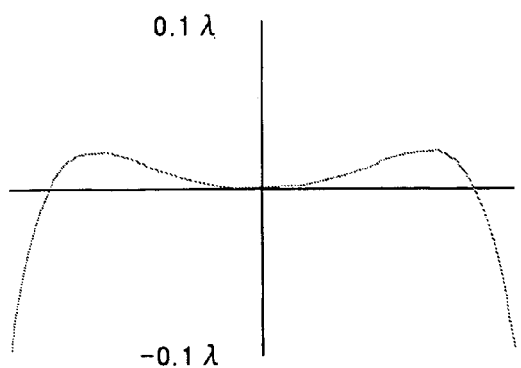
FIGS. 9A and 9B are aberration diagrams showing the axial wavefront aberration observed in Example 5.
Figure 9B:
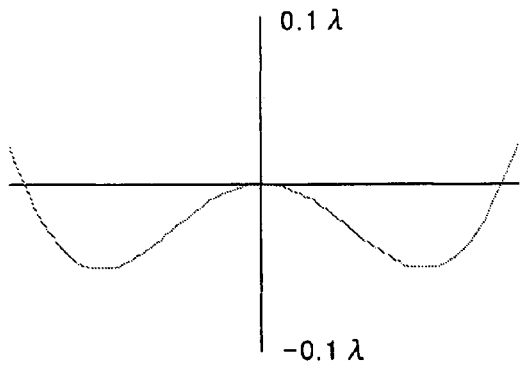
Figure 10A:
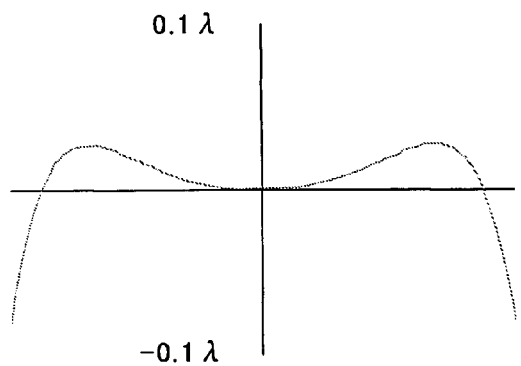
FIGS. 10A and 10B are aberration diagrams showing the axial wavefront aberration observed in Example 6.
Figure 10B:
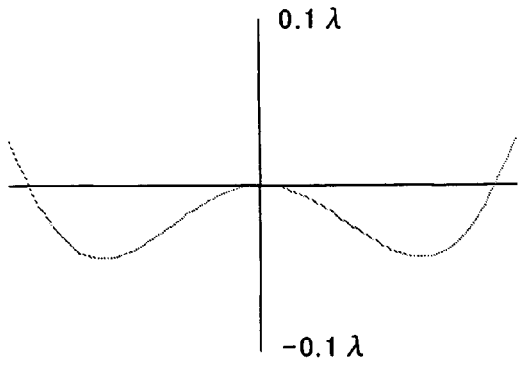
Figure 11A:
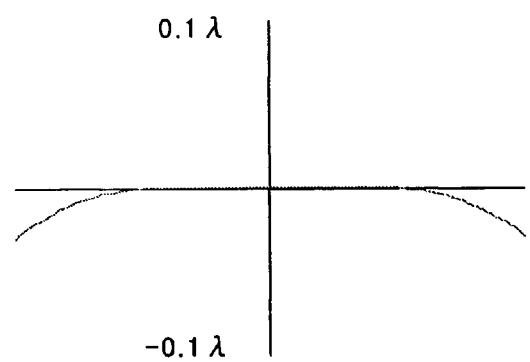
FIGS. 11A and 11B are aberration diagrams showing the axial wavefront aberration observed in Example 7.
Figure 11B:
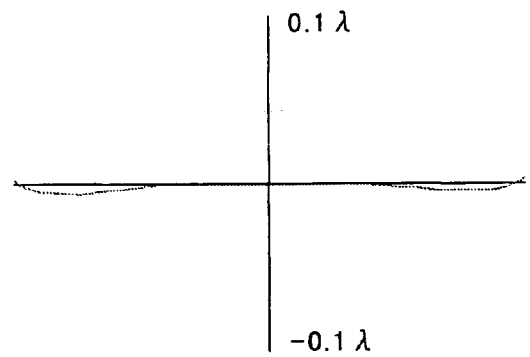
Figure 12A:
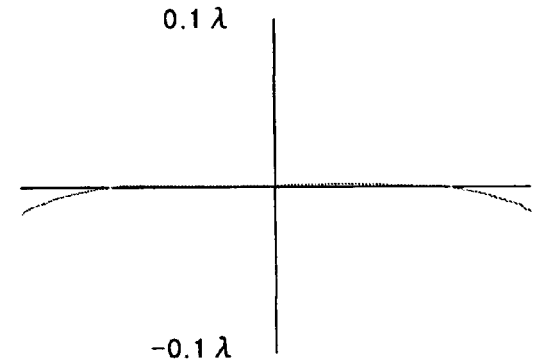
FIGS. 12A and 12B are aberration diagrams showing the axial wavefront aberration observed in Example 8.
Figure 12B:
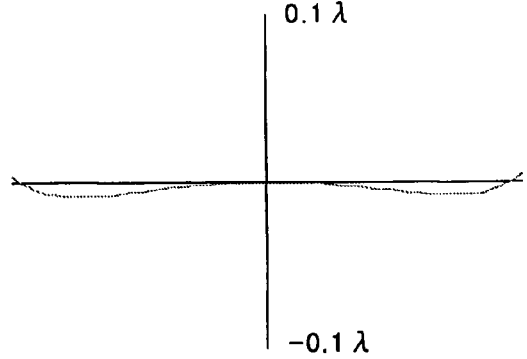
Figure 13A:
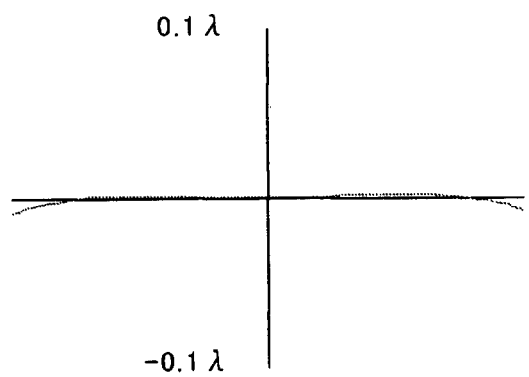
FIGS. 13A and 13B are aberration diagrams showing the axial wavefront aberration observed in Example 9.
Figure 13B:
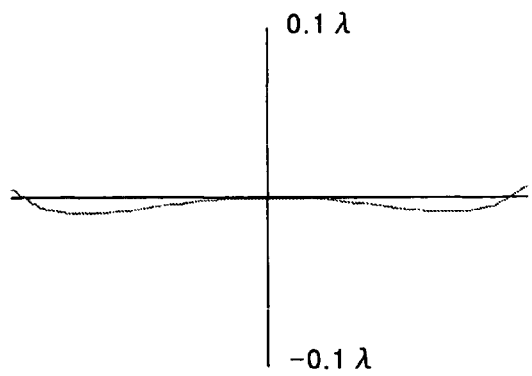
Figure 14A:
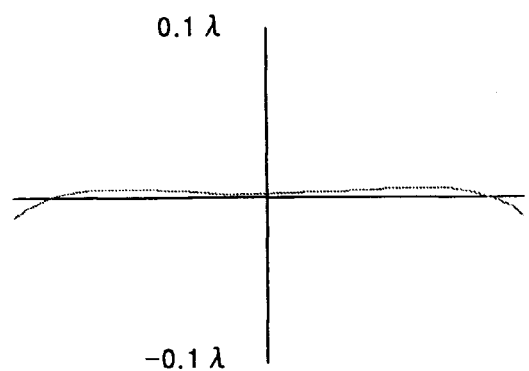
FIGS. 14A and 14B are aberration diagrams showing the axial wavefront aberration observed in Example 10.
Figure 14B:
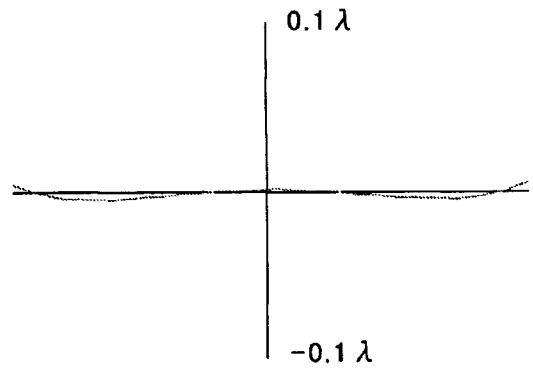
Figure 15A:
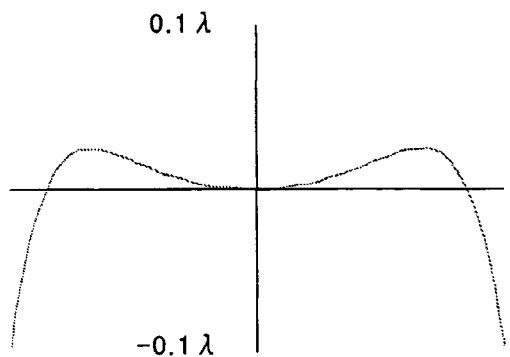
FIGS. 15A and 15B are aberration diagrams showing the axial wavefront aberration observed in Example 11.
Figure 15B:
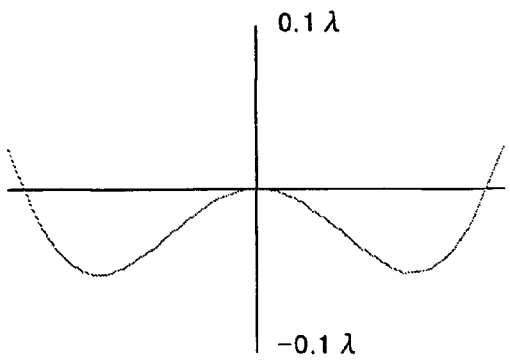
Figure 16A:
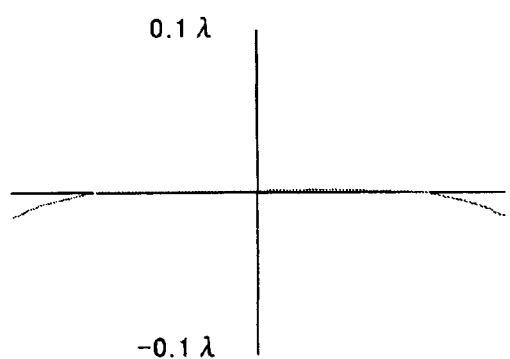
FIGS. 16A and 16 B are aberration diagrams showing the axial wavefront aberration observed in Example 12.
Figure 16B:
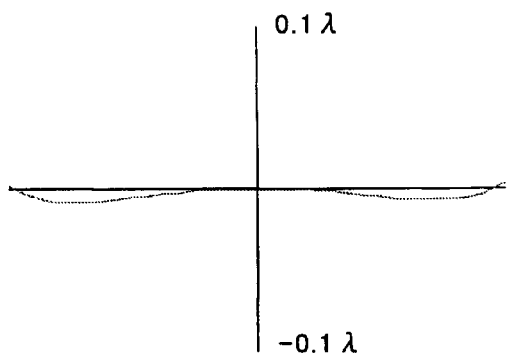
Figure 17A:
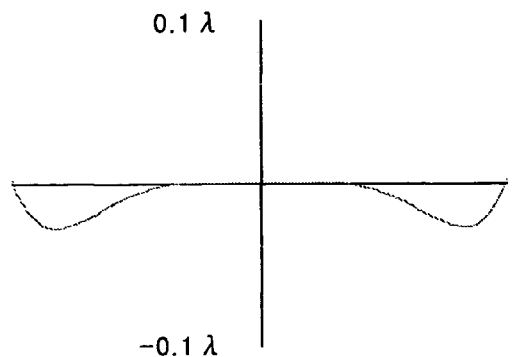
FIGS. 17A and 17B are aberration diagrams showing the axial wavefront aberration observed in Example 13.
Figure 17B:
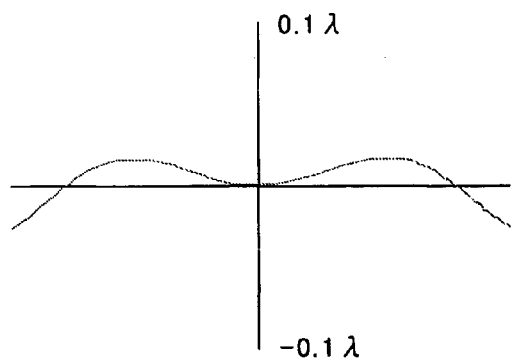
Figure 18A:
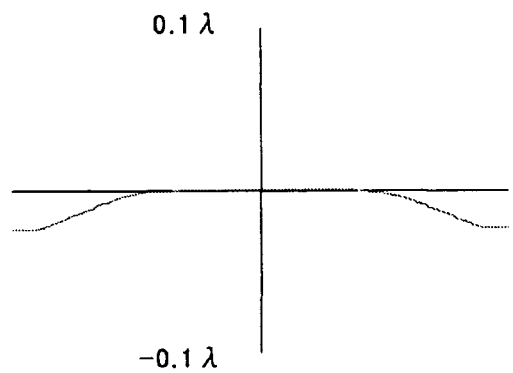
FIGS. 18A and 18B are aberration diagrams showing the axial wavefront aberration observed in Example 14.
Figure 18B:
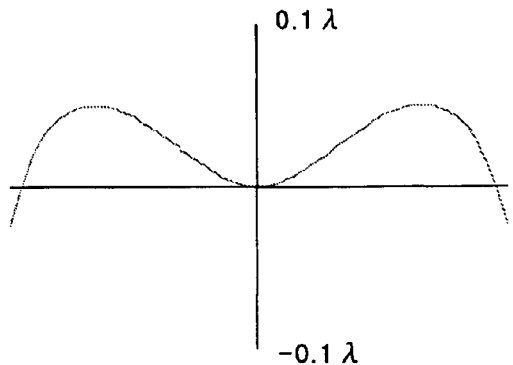

FIG. 4 shows, in a form plotted in a graph, the relationship between the value T1/T0 (shaping magnification=2.0×, T0=1.6) defined by conditional formula (1) and the design performance. The line plotted with black circles (●) represents the design performance given as wavefront aberration as observed at a light-entrance-side NA of 0.24; the line plotted with black rhombi (♦) represents the design performance given as wavefront aberration as observed at a light-entrance-side NA of 0.22; and the line plotted with black triangles (▲) represents the design performance given as wavefront aberration as observed at a light-entrance-side NA of 0.20. As will be understood from this graph, in the conditional range defined by conditional formula (1), it is possible to obtain a high shaping magnification and good design performance simultaneously. It should be noted that, in the design performance shown in FIG. 4, spherical aberration is ignored. The spherical aberration produced by the beam shaping device can be eliminated by the combined use of the collimator lens disposed on the downstream side thereof. Accordingly, at the design stage, spherical aberration is ignored, and the design performance is given as the degree of aberration excluding spherical aberration.

It is further preferable that conditional formula (1a) below be fulfilled.

$$1 \leq T1/T0 \leq 3 \tag{1a}$$

This conditional formula (1a) defines a further preferable conditional range within that defined by conditional formula (1) above from the above-mentioned viewpoints and out of other considerations.

With respect to the optical powers of the two surfaces of the beam shaping device, it is preferable that conditional formula (2) below be fulfilled.

$$0.05 \leq R1/R2 \leq 1.1 \tag{2}$$

where, assuming that the radius of curvature of a surface convex to the light-entrance side or concave to the light-exit side is positive and that the radius of curvature of a surface concave to the light-entrance side or convex to the light-exit side is negative, with respect to the major-axis direction of the cross section of the elliptic beam, R1 represents the radius of curvature of the light-entrance-side surface of the beam shaping device; and R2 represents the radius of curvature of the light-exit-side surface of the beam shaping device.

If the upper limit of conditional formula (2) is disregarded, large high-order aberrations result, making it difficult to obtain good design performance. By contrast, if the lower limit of conditional formula (2) is disregarded, the beam shaping device is unduly large, inevitably resulting in increased costs and making the system as a whole large and heavy.

It is further preferable that conditional formula (2a) below be fulfilled.

$$0.35 \leq R1/R2 \leq 1.1 \tag{2a}$$

This conditional formula (2a) defines a further preferable conditional range within that defined by conditional formula (2) above from the above-mentioned viewpoints and out of other considerations.

With respect to the relationship between the optical power of the light-entrance-side surface of the beam shaping device and the object distance, it is preferable that conditional formula (3) below be fulfilled.

$$0.45 \leq R1/T0 \leq 1.5 \tag{3}$$

where, assuming that the radius of curvature of a surface convex to the light-entrance side or concave to the light-exit side is positive and that the radius of curvature of a surface concave to the light-entrance side or convex to the light-exit side is negative, with respect to the major-axis direction of the cross section of the elliptic beam, R1 represents the radius of curvature of the light-entrance-side surface of the beam shaping device; and T0 represents the axial optical distance between the semiconductor laser light source and the beam shaping device.

If the upper limit of conditional formula (3) is disregarded, the beam shaping device is unduly large, making it difficult to make the optical pickup system as a whole compact. By contrast, if the lower limit of conditional formula (3) is disregarded, the radius of curvature of the first surface is too small, making production difficult.

It is further preferable that conditional formula (3a) below be fulfilled.

$$0.5 \leq R1/T0 \leq 1 \tag{3a}$$

This conditional formula (3a) defines a further preferable conditional range within that defined by conditional formula (3) above from the above-mentioned viewpoints and out of other considerations.

With respect to the relationship between the optical power of the light-entrance-side surface of the beam shaping device and the center thickness thereof, it is preferable that conditional formula (4) below be fulfilled.

$$0.1 \leq R1/T1 \leq 0.6 \tag{4}$$

where, assuming that the radius of curvature of a surface convex to the light-entrance side or concave to the light-exit side is positive and that the radius of curvature of a surface concave to the light-entrance side or convex to the light-exit side is negative, with respect to the major-axis direction of the cross section of the elliptic beam, R1 represents the radius of curvature of the light-entrance-side surface of the beam shaping device; and T1 represents the center thickness of the beam shaping device.

If the upper limit of conditional formula (4) is disregarded, large high-order aberrations result, making it difficult to obtain good design performance. By contrast, if the lower limit of conditional formula (4) is disregarded, the beam shaping device is unduly large, making it difficult to make the optical pickup system as a whole compact.

It is further preferable that conditional formula (4a) below be fulfilled.

$$0.3 \leq R1/T1 \leq 0.6 \tag{4a}$$

This conditional formula (4a) defines a further preferable conditional range within that defined by conditional formula (4) above from the above-mentioned viewpoints and out of other considerations.

With respect to the non-circular-arc cylindrical surface used as one surface of the beam shaping device, it is preferable that conditional formula (5) below be fulfilled.

$$-0.45 \leq AR \times fx^3 \leq 0.45 \tag{5}$$

where

AR represents the rotation-symmetric component of the fourth-order deformation coefficient relative to a cone; and fx represents the focal length in the shaping direction of the beam shaping device, which direction being identical with the major-axis direction of the cross section of the elliptic beam of the laser light.

Conditional formula (5) defines the conditional range that should preferably be fulfilled to achieve high performance with the beam shaping device. If the upper or lower limit of conditional formula (5) is disregarded, high-order aberrations result, making it impossible to obtain good design performance. Incidentally, The non-circular-arc cylindrical surface used as one surface of the beam shaping device is defined by formula (AAS) below, which represents the surface shape of a non-circular-arc surface.

$$\begin{aligned} Z = (X^2/Rx + Y^2/Ry) \Big/ \\ \{1 + [1 - (1+Kx) \cdot X^2/Rx^2 - (1+Ky) \cdot Y^2/Ry^2]^{1/2}\} + \\ AR \cdot [(1-AP) \cdot X^2 + (1+AP) \cdot Y^2]^2 + \\ BR \cdot [(1-BP) \cdot X^2 + (1+BP) \cdot Y^2]^3 + \\ CR \cdot [(1-CP) \cdot X^2 + (1+CP) \cdot Y^2]^4 + \\ DR \cdot [(1-DP) \cdot X^2 + (1+DP) \cdot Y^2]^5 \end{aligned} \tag{AAS}$$

where

X and Y represent the rectangular coordinates on a plane perpendicular to the optical axis AX;

Z represents the displacement (relative to the surface vertex) along the optical axis AX at the coordinates (X, Y);

Rx represents the paraxial radius of curvature in the X direction (=Rxi (i=1, 2));

Ry represents the paraxial radius of curvature in the Y direction (=Ryi (i=1, 2));

Kx represents the conic constant in the X direction;

Ky represents the conic constant in the Y direction;

AR, BR, CR, and DR represent the rotation-symmetric components of the deformation coefficients of the fourth, sixth, eighth, and tenth orders, respectively, relative to a cone; and AP, BP, CP, and DP represent the non-rotation-symmetric components of the deformation coefficients of the fourth, sixth, eighth, and tenth orders, respectively, relative to a cone.

It should be understood that the embodiments described above and the practical examples presented later encompass constructions like those described as (P1) to (P5) below. In beam shaping devices so constructed, the circular-arc cylindrical surface and non-circular-arc cylindrical surface both have a curvature only in the major-axis direction of the cross section of the elliptic beam. In this way, it is possible to realize a lightweight, compact, and high-performance beam shaping device that is easy to produce, that is suitable for use in the optical system of an optical pickup, and that affords a high shaping magnification. This makes it possible to achieve enhanced recording and reproducing accuracy, and to achieve enhanced laser light use efficiency, making it possible to cope with a blue semiconductor laser.

(P1) An optical pickup apparatus including a beam shaping device for converting the laser light emitted from a semiconductor laser light source from an elliptic beam to a circular beam, wherein, with respect to the light-entrance-side and light-exit-side surfaces of the beam shaping device, both of them have a curvature only in the major-axis direction of the cross section of the elliptic beam, one of them being a circular-arc cylindrical surface and the other a non-circular-arc cylindrical surface, and wherein at least one of conditional formulae (1), (1a), (2), (2a), (3), (3a), (4), (4a), and (5) noted earlier is fulfilled.

(P2) An optical pickup apparatus as described in (P1) above, wherein the light-entrance-side surface of the beam shaping device is a non-circular-arc cylindrical surface, and the light-exit-side surface of the beam shaping device is a circular-arc cylindrical surface.

(P3) An optical pickup apparatus as described in (P1) above, wherein the light-entrance-side surface of the beam shaping device is a circular-arc cylindrical surface, and the light-exit-side surface of the beam shaping device is a non-circular-arc cylindrical surface.

(P4) An optical pickup apparatus as described in one of (P1) to (P3) above, wherein the light-entrance-side surface of the beam shaping device is a convex surface, and the light-exit-side surface of the beam shaping device is a concave surface.

(P5) An optical pickup apparatus as described in one of (P1) to (P4) above, further including a collimator optical system for collimating the laser light having been converted into the circular beam by the beam shaping device.

EXAMPLES

Hereinafter, the optical construction and other features of practical examples of beam shaping devices embodying the present invention will be presented with reference to their construction data and other data. Examples 1 to 14 presented below are different numerical examples of the optical construction corresponding to the embodiment (FIG. 1) described above. Of these examples, Example 1 is the numerical example that is identical in shape with the embodiment specifically described above.

Tables 1 to 14 show the construction data of Examples 1 to 14, respectively. Table 15 shows the values of the parameters used in each conditional formula as actually observed in each example. In the construction data of each example, $\lambda$ represents the design wavelength (nm); fx represents the focal length in the X direction; fy represents the focal length in the Y direction; Entrance-Side NAx represents the numerical aperture in the X direction as observed on the side at which the laser light enters; Exit-Side NAx represents the numerical aperture in the X direction as observed on the side at which the laser light exits; and W represents the remnant aberration (m$\lambda$rms). Here, it is assumed that the X direction coincides with the major-axis direction of the cross section of the elliptic beam, and the Y direction coincides with the minor-axis direction of the cross section of the elliptic beam.

In the construction data of each example, Si (i=0, 1, 2) represents the i-th surface counted from the object side. For example, surface S0 is the light-emitting surface of the laser light source 1, which surface corresponds to the object plane; surface S1 is the light-entrance-side surface (first surface) of the beam shaping device BC; and surface S2 is the light-exit-side surface (second surface) of the beam shaping device BC. Rxi (i=0, 1, 2) represents the X-direction paraxial radius of curvature (mm) of surface Si, and Ryi (i=0, 1, 2) represents the Y-direction paraxial radius of curvature (mm) of surface Si. Ti (i=0, 1) represents the axial distance (mm) between surface Si and surface Si+1, and Ni (i=0, 1) represents the refractive index at wavelength $\lambda$ of the medium filling the axial distance Ti. A surface Si marked with an asterisk (*) is a non-circular-arc cylindrical surface, which is defined by formula (AAS) noted earlier, which represents the surface shape of a non-circular-arc surface. Also shown in Tables 1 to 14 are the non-circular-arc surface data of the respective examples. Here, it should be noted that any term having a zero coefficient is unlisted, and that, for all data, E−n stands for $\times 10^{-n}$ and E+n stands for $\times 10^{+n}$.

FIGS. 5A and 5B to FIGS. 18A and 18B are aberrations diagrams corresponding to Examples 1 to 14, respectively, each diagram showing the axial wavefront aberration observed for light having a wavelength $\lambda$ of 407.7 nm. Of these diagrams, those suffixed with "A" show Y-direction wavefront aberration, and those suffixed with "B" show X-direction wavefront aberration. It should be noted that, in the design performance shown in these diagrams, spherical aberration is ignored. The spherical aberration produced by the beam shaping device can be eliminated by the combined use of the collimator lens disposed on the downstream side thereof. Accordingly, at the design stage, spherical aberration is ignored, and the design performance is given as the degree of aberration excluding spherical aberration.

TABLE 1

| Example 1 | fx [mm] | 0.87 | Entrance-Side NAx | 0.15 |
|---|---|---|---|---|
| | fy [mm] | ∞ | Exit-Side NAx | 0.075 |
| | λ [nm] | 407.7 | W [m λ rms] | 2.8 |
| Si | Rxi [mm] | Ryi [mm] | Ti [mm] | Ni (407.7 nm) |
| S0 | ∞ | ∞ | 1.00 | 1.00000 |
| S1* | 0.56558 | ∞ | 1.00 | 1.792882 |
| S2 | 0.68266 | ∞ | | |

| Kx | 0 | | | | | | |
|---|---|---|---|---|---|---|---|
| AR | −2.79E−01 | BR | 1.23E−01 | CR | −1.08E+00 | DR | 0 |
| AP | −1 | BP | −1 | CP | −1 | DP | 0 |

*Non-Circular-Arc Surface Data of 1st Surface (S1)

TABLE 2

| Example 2 | fx [mm] | 1.09 | Entrance-Side NAx | 0.15 |
|---|---|---|---|---|
| | fy [mm] | ∞ | Exit-Side NAx | 0.075 |
| | λ [nm] | 407.7 | W [m λ rms] | 2.8 |
| Si | Rxi [mm] | Ryi [mm] | Ti [mm] | Ni (407.7 nm) |
| S0 | ∞ | ∞ | 1.00 | 1.00000 |
| S1* | 0.92071 | ∞ | 2.50 | 1.792882 |
| S2 | 2.62363 | ∞ | | |

| Kx | 0 | | | | | | |
|---|---|---|---|---|---|---|---|
| AR | −1.34E−01 | BR | 1.51E−01 | CR | −6.28E−01 | DR | 0 |
| AP | −1 | BP | −1 | CP | −1 | DP | 0 |

*Non-Circular-Arc Surface Data of 1st Surface (S1)

TABLE 3

| Example 3 | fx [mm] | 1.53 | Entrance-Side NAx | 0.15 |
|---|---|---|---|---|
|  | fy [mm] | ∞ | Exit-Side NAx | 0.075 |
|  | λ [nm] | 407.7 | W [m λ rms] | 3.0 |
| Si | Rxi [mm] | Ryi [mm] | Ti [mm] | Ni (407.7 nm) |
| S0 | ∞ | ∞ | 1.00 | 1.00000 |
| S1* | 1.34116 | ∞ | 10.00 | 1.792882 |
| S2 | 28.78761 | ∞ |  |  |

| Kx | 0 | | | | | | |
|---|---|---|---|---|---|---|---|
| AR | −8.11E−02 | BR | 1.15E−01 | CR | −4.98E−01 | DR | 0 |
| AP | −1 | BP | −1 | CP | −1 | DP | 0 |

*Non-Circular-Arc Surface Data of 1st Surface (S1)

TABLE 4

| Example 4 | fx [mm] | 0.86 | Entrance-Side NAx | 0.25 |
|---|---|---|---|---|
|  | fy [mm] | ∞ | Exit-Side NAx | 0.125 |
|  | λ [nm] | 407.7 | W [m λ rms] | 23.0 |
| Si | Rxi [mm] | Ryi [mm] | Ti [mm] | Ni (407.7 nm) |
| S0 | ∞ | ∞ | 1.00 | 1.00000 |
| S1* | 0.56159 | ∞ | 1.00 | 1.792882 |
| S2 | 0.6707 | ∞ |  |  |

| Kx | 0 | | | | | | |
|---|---|---|---|---|---|---|---|
| AR | −2.87E−01 | BR | 7.22E−02 | CR | −4.98E−01 | DR | 0 |
| AP | −1 | BP | −1 | CP | −1 | DP | 0 |

*Non-Circular-Arc Surface Data of 1st Surface (S1)

TABLE 5

| Example 5 | fx [mm] | 1.07 | Entrance-Side NAx | 0.25 |
|---|---|---|---|---|
|  | fy [mm] | ∞ | Exit-Side NAx | 0.125 |
|  | λ [nm] | 407.7 | W [m λ rms] | 20.2 |
| Si | Rxi [mm] | Ryi [mm] | Ti [mm] | Ni (407.7 nm) |
| S0 | ∞ | ∞ | 1.00 | 1.00000 |
| S1* | 0.91239 | ∞ | 2.50 | 1.792882 |
| S2 | 2.56212 | ∞ |  |  |

| Kx | 0 | | | | | | |
|---|---|---|---|---|---|---|---|
| AR | −1.40E−01 | BR | 1.07E−01 | CR | −1.55E−01 | DR | 0 |
| AP | −1 | BP | −1 | CP | −1 | DP | 0 |

*Non-Circular-Arc Surface Data of 1st Surface (S1)

TABLE 6

| Example 6 | fx [mm] | 1.51 | Entrance-Side NAx | 0.25 |
|---|---|---|---|---|
|  | fy [mm] | ∞ | Exit-Side NAx | 0.125 |
|  | λ [nm] | 407.7 | W [m λ rms] | 19.2 |
| Si | Rxi [mm] | Ryi [mm] | Ti [mm] | Ni (407.7 nm) |
| S0 | ∞ | ∞ | 1.00 | 1.00000 |
| S1* | 1.32768 | ∞ | 10.00 | 1.792882 |
| S2 | 28.04153 | ∞ |  |  |

| Kx | 0 | | | | | | |
|---|---|---|---|---|---|---|---|
| AR | −9.08E−02 | BR | 1.04E−01 | CR | −1.49E−01 | DR | 0 |
| AP | −1 | BP | −1 | CP | −1 | DP | 0 |

*Non-Circular-Arc Surface Data of 1st Surface (S1)

TABLE 7

| Example 7 | fx [mm] | 0.64 | Entrance-Side NAx | 0.15 |
|---|---|---|---|---|
|  | fy [mm] | ∞ | Exit-Side NAx | 0.06 |
|  | λ [nm] | 407.7 | W [m λ rms] | 3.9 |
| Si | Rxi [mm] | Ryi [mm] | Ti [mm] | Ni (407.7 nm) |
| S0 | ∞ | ∞ | 1.00 | 1.00000 |
| S1* | 0.47239 | ∞ | 1.00 | 1.792882 |
| S2 | 0.45762 | ∞ |  |  |

| Kx | 0 | | | | | | |
|---|---|---|---|---|---|---|---|
| AR | −4.15E−01 | BR | 6.20E−02 | CR | −1.65E+00 | DR | 0 |
| AP | −1 | BP | −1 | CP | −1 | DP | 0 |

*Non-Circular-Arc Surface Data of 1st Surface (S1)

TABLE 8

| Example 8 | fx [mm] | 0.81 | Entrance-Side NAx | 0.15 |
|---|---|---|---|---|
|  | fy [mm] | ∞ | Exit-Side NAx | 0.06 |
|  | λ [nm] | 407.7 | W [m λ rms] | 2.6 |
| Si | Rxi [mm] | Ryi [mm] | Ti [mm] | Ni (407.7 nm) |
| S0 | ∞ | ∞ | 1.00 | 1.00000 |
| S1* | 0.76751 | ∞ | 2.50 | 1.792882 |
| S2 | 1.74944 | ∞ |  |  |

| Kx | 0 | | | | | | |
|---|---|---|---|---|---|---|---|
| AR | −1.87E−01 | BR | 1.63E−01 | CR | −5.38E−01 | DR | 0 |
| AP | −1 | BP | −1 | CP | −1 | DP | 0 |

*Non-Circular-Arc Surface Data of 1st Surface (S1)

TABLE 9

| Example 9 | fx [mm] | 1.20 | Entrance-Side NAx | 0.15 |
|---|---|---|---|---|
|  | fy [mm] | ∞ | Exit-Side NAx | 0.06 |
|  | λ [nm] | 407.7 | W [m λ rms] | 3.0 |
| Si | Rxi [mm] | Ryi [mm] | Ti [mm] | Ni (407.7 nm) |
| S0 | ∞ | ∞ | 1.00 | 1.00000 |
| S1* | 1.11769 | ∞ | 10.00 | 1.792882 |
| S2 | 19.1915 | ∞ |  |  |

| Kx | 0 | | | | | | |
|---|---|---|---|---|---|---|---|
| AR | −1.14E−01 | BR | 2.27E−01 | CR | −9.82E−01 | DR | 0 |
| AP | −1 | BP | −1 | CP | −1 | DP | 0 |

*Non-Circular-Arc Surface Data of 1st Surface (S1)

TABLE 10

| Example 10 | fx [mm] | 1.07 | Entrance-Side NAx | 0.15 |
|---|---|---|---|---|
|  | fy [mm] | ∞ | Exit-Side NAx | 0.075 |
|  | λ [nm] | 407.7 | W [m λ rms] | 2.7 |
| Si | Rxi [mm] | Ryi [mm] | Ti [mm] | Ni (407.7 nm) |
| S0 | ∞ | ∞ | 1.00 | 1.00000 |
| S1* | 1.03647 | ∞ | 2.50 | 1.917867 |
| S2 | 2.73324 | ∞ |  |  |

| Kx | 0 | | | | | | |
|---|---|---|---|---|---|---|---|
| AR | −1.03E−01 | BR | 1.31E−01 | CR | −5.62E−01 | DR | 0 |
| AP | −1 | BP | −1 | CP | −1 | DP | 0 |

*Non-Circular-Arc Surface Data of 1st Surface (S1)

TABLE 11

| Example 11 | fx [mm] | 1.10 | Entrance-Side NAx | 0.25 |
|---|---|---|---|---|
|  | fy [mm] | ∞ | Exit-Side NAx | 0.125 |
|  | λ [nm] | 407.7 | W [m λ rms] | 20.9 |
| Si | Rxi [mm] | Ryi [mm] | Ti [mm] | Ni (407.7 nm) |
| S0 | ∞ | ∞ | 1.00 | 1.00000 |
| S1* | 0.74163 | ∞ | 2.50 | 1.618461 |
| S2 | 2.34701 | ∞ |  |  |

TABLE 11-continued

| Kx | 0 | | | | | | |
|---|---|---|---|---|---|---|---|
| AR | −2.22E−01 | BR | 1.49E−01 | CR | −2.43E−01 | DR | 0 |
| AP | −1 | BP | −1 | CP | −1 | DP | 0 |

*Non-Circular-Arc Surface Data of 1st Surface (S1)

TABLE 12

| Exam-ple 12 | fx [mm] | 0.80 | Entrance-Side NAx | 0.15 | |
| --- | --- | --- | --- | --- | --- |
| | fy [mm] | ∞ | Exit-Side NAx | 0.06 | |
| | λ [nm] | 407.7 | W [m λ rms] | 2.5 | |
| Si | Rxi [mm] | Ryi [mm] | Ti [mm] | Ni (407.7 nm) | |
| S0 | ∞ | ∞ | | | |
| | | | 1.00 | 1.00000 | |
| S1* | 0.84833 | ∞ | | | |
| | | | 2.50 | 1.896855 | |
| S2 | 1.81218 | ∞ | | | |

| Kx | 0 | | | | | | |
|---|---|---|---|---|---|---|---|
| AR | −1.48E−01 | BR | 1.38E−01 | CR | −4.41E−01 | DR | 0 |
| AP | −1 | BP | −1 | CP | −1 | DP | 0 |

*Non-Circular-Arc Surface Data of 1st Surface (S1)

TABLE 13

| Exam-ple 13 | fx [mm] | 0.86 | Entrance-Side NAx | 0.15 | |
| --- | --- | --- | --- | --- | --- |
| | fy [mm] | ∞ | Exit-Side NAx | 0.06 | |
| | λ [nm] | 407.7 | W [m λ rms] | 20.8 | |
| Si | Rxi [mm] | Ryi [mm] | Ti [mm] | Ni (407.7 nm) | |
| S0 | ∞ | ∞ | | | |
| | | | 1.00 | 1.00000 | |
| S1 | 0.78865 | ∞ | | | |
| | | | 2.50 | 1.792882 | |
| S2* | 1.92544 | ∞ | | | |

| Kx | 0 | | | | | | |
|---|---|---|---|---|---|---|---|
| AR | 3.31E−01 | BR | −2.69E+00 | CR | 5.71E+01 | DR | 0 |
| AP | −1 | BP | −1 | CP | −1 | DP | 0 |

*Non-Circular-Arc Surface Data of 2nd Surface (S2)

TABLE 14

| Exam-ple 14 | fx [mm] | 1.13 | Entrance-Side NAx | 0.15 | |
| --- | --- | --- | --- | --- | --- |
| | fy [mm] | ∞ | Exit-Side NAx | 0.075 | |
| | λ [nm] | 407.7 | W [m λ rms] | 13.2 | |
| Si | Rxi [mm] | Ryi [mm] | Ti [mm] | Ni (407.7 nm) | |
| S0 | ∞ | ∞ | | | |
| | | | 1.00 | 1.00000 | |
| S1 | 0.94401 | ∞ | | | |
| | | | 2.50 | 1.792882 | |
| S2* | 2.79746 | ∞ | | | |

| Kx | 0 | | | | | | |
|---|---|---|---|---|---|---|---|
| AR | 7.64E−02 | BR | 9.22E−02 | CR | 1.45E+00 | DR | 0 |
| AP | −1 | BP | −1 | CP | −1 | DP | 0 |

*Non-Circular-Arc Surface Data of 2nd Surface (S2)

TABLE 15

| | Values Corresponding to Conditional Formulae | | | | |
| --- | --- | --- | --- | --- | --- |
| | (1), (1a) T1/T0 | (2), (2a) R1/R2 | (3), (3a) R1/T0 | (4), (4a) R1/T1 | (5) AR × fx³ |
| Example 1 | 1.00 | 0.83 | 0.57 | 0.57 | −0.18 |
| Example 2 | 2.50 | 0.35 | 0.92 | 0.37 | −0.17 |
| Example 3 | 10.00 | 0.05 | 1.34 | 0.13 | −0.29 |
| Example 4 | 1.00 | 0.84 | 0.56 | 0.56 | −0.18 |

TABLE 15-continued

| | Values Corresponding to Conditional Formulae | | | | |
| --- | --- | --- | --- | --- | --- |
| | (1), (1a) T1/T0 | (2), (2a) R1/R2 | (3), (3a) R1/T0 | (4), (4a) R1/T1 | (5) AR × fx³ |
| Example 5 | 2.50 | 0.36 | 0.91 | 0.36 | −0.17 |
| Example 6 | 10.00 | 0.05 | 1.33 | 0.13 | −0.31 |
| Example 7 | 1.00 | 1.03 | 0.47 | 0.47 | −0.11 |
| Example 8 | 2.50 | 0.44 | 0.77 | 0.31 | −0.10 |
| Example 9 | 10.00 | 0.06 | 1.12 | 0.11 | −0.20 |
| Example 10 | 2.50 | 0.38 | 1.04 | 0.41 | −0.13 |
| Example 11 | 2.50 | 0.32 | 0.74 | 0.30 | −0.30 |
| Example 12 | 2.50 | 0.47 | 0.85 | 0.34 | −0.08 |
| Example 13 | 2.50 | 0.41 | 0.79 | 0.32 | 0.21 |
| Example 14 | 2.50 | 0.34 | 0.94 | 0.38 | 0.11 |

What is claimed is:

1. A beam shaping device for converting an elliptical cross section of a beam of laser light emitted from a semiconductor laser light source,
    wherein light-entrance-side and light-exit-side surfaces of the beam shaping device both have a curvature only in a direction corresponding to the major-axis direction of the cross section of the beam, so that the beam shaping device reduces the diameter of the beam along the major axis thereof,
    wherein the light-entrance-side surface of the beam shaping device is a convex surface, and the light-exit-side surface of the beam shaping device is a concave surface;
    wherein, of the light-entrance-side and light-exit-side surfaces, one is a circular-arc cylindrical surface and the other is a non-circular-arc cylindrical surface, and
    wherein the following conditional formula is fulfilled:

$$1 \leq T1/T0 \leq 10$$

where
   T1 represents a center thickness of the beam shaping device; and
   T0 represents an axial optical distance between the semiconductor laser light source and the beam shaping device.

2. A beam shaping device as claimed in claim 1, wherein the light-entrance-side surface of the beam shaping device is a circular-arc cylindrical surface, and the light-exit-side surface of the beam shaping device is a non-circular-arc cylindrical surface.

3. A beam shaping device as claimed in claim 1, wherein the light-entrance-side surface of the beam shaping device is a non-circular-arc cylindrical surface, and the light-exit-side surface of the beam shaping device is a circular-arc cylindrical surface.

4. A beam shaping device as claimed in claim 1, wherein the non-circular-arc cylindrical surface fulfills the following conditional formula:

$$-0.45 \leq AR \times fx^3 \leq 0.45$$

where
   AR represents a rotation-symmetric component of a fourth-order deformation coefficient relative to a cone; and
   fx represents a focal length in a shaping direction of the beam shaping device, which direction being identical with the major-axis direction of the cross section of the elliptic beam of the laser light.

5. An optical pickup apparatus for recording and/or reproducing optical information to and/or from an optical information recording medium, the optical pickup apparatus comprising:
- a laser light source that emits a laser beam having an elliptical cross-section;
- a beam shaping device as claimed in claim 1; and
- an objective lens that condenses the laser beam on an optical recording surface of the optical information recording medium.

6. An optical pickup apparatus as claimed in claim 5, further comprising:
- a collimator lens that collimates the laser beam having exited from the beam shaping device.

7. An optical pickup apparatus as claimed in claim 5, wherein the light-entrance-side surface of the beam shaping device is a circular-arc cylindrical surface, and the light-exit-side surface of the beam shaping device is a non-circular-arc cylindrical surface.

8. An optical pickup apparatus as claimed in claim 5, wherein the light-entrance-side surface of the beam shaping device is a non-circular-arc cylindrical surface, and the light-exit-side surface of the beam shaping device is a circular-arc cylindrical surface.

9. An optical pickup apparatus as claimed in claim 5, wherein the non-circular-arc cylindrical surface fulfills the following conditional formula:

$$-0.45 \leq AR \times fx^3 \leq 0.45$$

where
- AR represents a rotation-symmetric component of a fourth-order deformation coefficient relative to a cone; and
- fx represents a focal length in a shaping direction of the beam shaping device, which direction being identical with the major-axis direction of the cross section of the elliptic beam of the laser light.

10. A beam shaping device as claimed in claim 1, wherein the beam shaping device converts the elliptical cross section of a beam of laser light into a circular cross section.

11. An optical pickup apparatus as claimed in claim 5, wherein the beam shaping device converts the elliptical cross section of the laser light into a circular cross section.

12. A beam shaping device for converting an elliptical cross section of a beam of laser light emitted from a semiconductor laser light source,
- wherein light-entrance-side and light-exit-side surfaces of the beam shaping device both have a curvature only in a direction corresponding to a major-axis direction of the elliptical cross section of the beam, so that the beam shaping device reduces the diameter of the beam along the major axis thereof;
- wherein the light-entrance-side surface of the beam shaping device is a convex surface, and the light-exit-side surface of the beam shaping device is a concave surface;
- wherein one of the light-entrance-side and light-exit-side surfaces is a circular-arc cylindrical surface and the other is a non-circular-arc cylindrical surface, and
- wherein the following conditional formula is fulfilled:

$$0.05 \leq R1/R2 \leq 1.1$$

where, assuming that a radius of curvature of a surface convex to a light-entrance side or concave to a light-exit side is positive and that a radius of curvature of a surface concave to a light-entrance side or convex to a light-exit side is negative, with respect to the major-axis direction of the cross section of the elliptic beam,
- R1 represents a radius of curvature of the light-entrance-side surface of the beam shaping device; and
- R2 represents a radius of curvature of the light-exit-side surface of the beam shaping device.

13. An optical pickup apparatus for recording and/or reproducing optical information to and/or from an optical information recording medium, the optical pickup apparatus comprising:
- a laser light source that emits a laser beam having an elliptical cross-section;
- a beam shaping device as claimed in claim 12; and
- an objective lens that condenses the laser beam on an optical recording surface of the optical information recording medium.

14. An optical pickup apparatus as claimed in claim 13, wherein the beam shaping device converts the elliptical cross section of the laser light into a circular cross section.

15. A beam shaping device as claimed in claim 12, wherein the beam shaping device converts the elliptical cross section of a beam of laser light into a circular cross section.

16. A beam shaping device for converting an elliptical cross section of a beam of laser light emitted from a semiconductor laser light source,
- wherein light-entrance-side and light-exit-side surfaces of the beam shaping device both have a curvature only in a direction corresponding to a major-axis direction of the cross section of the beam, so that the beam shaping device reduces the diameter of the beam along the major axis thereof;
- wherein one of the light-entrance-side and light-exit-side surfaces is a circular-arc cylindrical surface and the other is a non-circular-arc cylindrical surface, and
- wherein the following conditional formula is fulfilled:

$$0.45 \leq R1/T0 \leq 1.5$$

where, assuming that a radius of curvature of a surface convex to a light-entrance side or concave to a light-exit side is positive and that a radius of curvature of a surface concave to a light-entrance side or convex to a light-exit side is negative, with respect to the major-axis direction of the cross section of the elliptic beam,
- R1 represents a radius of curvature of the light-entrance-side surface of the beam shaping device; and
- T0 represents an axial optical distance between the semiconductor laser light source and the beam shaping device.

17. An optical pickup apparatus for recording and/or reproducing optical information to and/or from an optical information recording medium, the optical pickup apparatus comprising:
- a laser light source that emits a laser beam having an elliptical cross-section;
- a beam shaping device as claimed in claim 16; and
- an objective lens that condenses the laser beam on an optical recording surface of the optical information recording medium.

18. An optical pickup apparatus as claimed in claim 17, wherein the beam shaping device converts the elliptical cross section of the laser light into a circular cross section.

19. A beam shaping device as claimed in claim 16, wherein the beam shaping device converts the elliptical cross section of a beam of laser light into a circular cross section.

20. A beam shaping device for converting an elliptical cross section of a beam of laser light emitted from a semiconductor laser light source, wherein light-entrance-side and light-exit-side surfaces of the beam shaping device both have a curvature only in a major-axis direction of a cross section of the elliptic beam;

wherein one of the light-entrance-side and light-exit-side surfaces is a circular-arc cylindrical surface and the other is a non-circular-arc cylindrical surface, and wherein the following conditional formula is fulfilled:

$$0.1 \leq R1/T1 \leq 0.6$$

where, assuming that a radius of curvature of a surface convex to a light-entrance side or concave to a light-exit side is positive and that a radius of curvature of a surface concave to a light-entrance side or convex to a light-exit side is negative, with respect to the major-axis direction of the cross section of the elliptic beam, R1 represents a radius of curvature of the light-entrance-side surface of the beam shaping device; and T1 represents a center thickness of the beam shaping device.

21. An optical pickup apparatus for recording and/or reproducing optical information to and/or from an optical information recording medium, the optical pickup apparatus comprising:

a laser light source that emits a laser beam having an elliptical cross-section;

a beam shaping device as claimed in claim 20; and an objective lens that condenses the laser beam on an optical recording surface of the optical information recording medium.

22. An optical pickup apparatus as claimed in claim 21, wherein the beam shaping device converts the elliptical cross section of the laser light into a circular cross section.

23. A beam shaping device as claimed in claim 20, wherein the beam shaping device converts the elliptical cross section of a beam of laser light into a circular cross section.

* * * * *